April 26, 1960 A. ZAHNER 2,934,187
SPEAKING MACHINE
Filed Sept. 26, 1957 3 Sheets-Sheet 1

INVENTOR
ADRIEN ZAHNER
BY Irwin J. Thomas
ATTY.

April 26, 1960 A. ZAHNER 2,934,187
SPEAKING MACHINE

Filed Sept. 26, 1957 3 Sheets-Sheet 3

INVENTOR
ADRIEN ZAHNER
BY Irwin S. Thompson
ATTY.

United States Patent Office 2,934,187
Patented Apr. 26, 1960

2,934,187

SPEAKING MACHINE

Adrien Zahner, Sainte-Croix, Switzerland, assignor to Thorens S.A., Sainte-Croix, Switzerland, a limited liability stock company of Switzerland Application September 26, 1957, Serial No. 686,505

Claims priority, application Switzerland February 25, 1957

12 Claims. (Cl. 192—4)

Among the driving devices of the turn-table of a speaking machine, one of the most used comprises a step-pulley, fixed on the motor axle and an intermediary wheel co-operating, on the one hand, with the step-pulley and, on the other hand, with the turn-table edge. The said intermediary wheel, which carries generally a rubber band or any other supple and elastic material, may be axially displaced in order to come, at will, into contact with each step of the pulley, and thus to drive the turn-table at different speeds, each of which is relatively precise.

The main advantage of this device consists in its great simplicity. But, on the other hand, in order to steady the frictional driving, the intermediary wheel always exerts a certain pressure, on the one hand, on the step-pulley and, in the other hand, on the turn-table edge. Now the step-pulley being rigidly fixed on the motor shaft, it follows that the vibrations of this motor are transmitting without adequate lessening to the turn-table and the apparatus frame; this is so in spite of a very supple suspension of the motor with respect to the frame, and in spite of the rubber band that the intermediary wheel comprises.

In order to better insulate the motor with respect to the other members of the speaking machine, it has been proposed to place the step-pulley on an intermediate shaft, separate from that of the motor and fixed on the frame of the apparatus. The step-pulley is then driven by the motor by means of a belt which may be sufficiently long and supple in order that, practically, no vibration is transmitted from the motor to the step-pulley and the frame. In order to derive all the possible benefit from this solution, it is essential that the motor should be fixed on the frame by means of very supple damping devices, so that the motor vibrations are strongly dampened before they reach the frame.

The variations of the friction coefficients of the various bearings, the state of the rubber band and the state of the belt, as well as the motor temperature variations, cause variations in the driving speed of the turn-table. That is why high quality apparatus comprise an accurate speed control device. This device is generally embodied in the shape of a copper or aluminium Ferrari disc, fixed on the motor axle and revolving in a magnet air-gap. The electro-magnetic braking action thus effected is a function of the magnet position with respect to the disc, and allows the exact control of the driving speed of the turn-table.

Experience shows that this kind of control device presents three disadvantages due to the fact that the Ferrari disc is fixed to the motor axle, and consequently the said disadvantages bring a sensible increase of the transmission of vibrations from the motor to the frame of the speaking machine.

(a) The masses of the motor that are rapidly rotated (rotor, axle and pulley) are augmented by the presence of the Ferrari disc which must be disposed at the end of the motor axle. Consequently, the dynamic counter-balancing is made more difficult;

(b) The braking magnet and the mechanism for controlling its position with respect to the Ferrari disc must be necessarily rigidly fixed on the motor frame. Thus, the mass of this braking magnet is added to the mass of the motor. Now, a very supple suspension of the motor with respect to the speaking machine frame is the more difficult to realize as the suspended mass is greater. To an increase of the suspended mass there corresponds generally an increase of the vibrations transmission of the frame;

(c) The turn-table speed control being performed with the help of a control button, placed on the apparatus frame, it is necessary to connect, by means of levers, the control mechanism of the braking magnet to the said button. There thus results a new increase of the suspended masses and a suspension stiffening. Besides, the construction of a control mechanism which is simultaneously precise and very supple presents great difficulties.

This invention has for its object a speaking machine comprising a turn-table driven by a driving device of the type comprising a driving member mechanically connected, on the one hand, to a motor shaft and, on the other hand, to the turn-table. This driving device tends to overcome the mentioned difficulties by the fact that it comprises a control device for the turn-table speed which exerts a braking action on a member fastened to the said driving member and by the fact that a control member, carried by the speaking machine frame and connected to a movable part of the said braking device, permits modification of the value of the braking action exerted on the said driving member.

The attached drawing shows schematically and by way of example two embodiments of a speaking machine in accordance with the invention.

Figure 1:
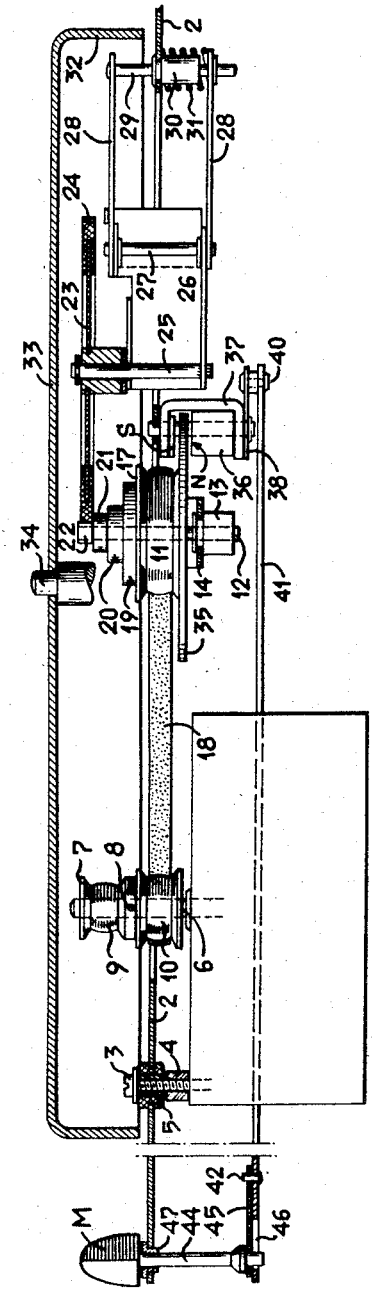
Fig. 1 is a cross-sectional view taken on line I—I of Fig. 2 of the first embodiment.
Figure 2:
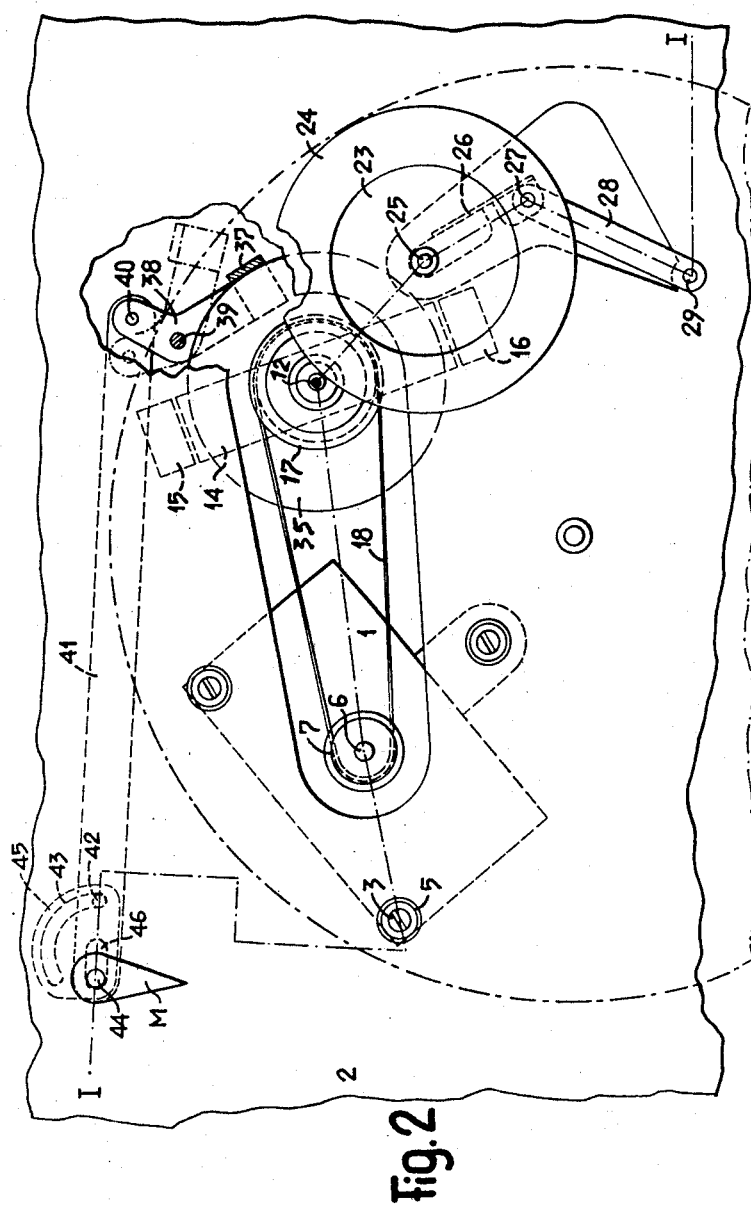
Fig. 2 is a plan view thereof.

The speaking machine represented in Figs. 1 and 2 comprises a motor 1, elastically suspended from a frame 2 by means of elastic suspension devices (only one of them being represented) which each comprises a fastening screw 3, screwed in the frame of the motor 1 and extending through a distance-piece 4 and an elastic element 5, the circumference of which is rigidly fastened to the frame 2. A pulley 7 comprising two grooves 9 and 10, of various diameters, is rigidly fastened on the shaft 6 of the motor 1 by means of a screw 8, disposed between these two grooves, which are placed symmetrically on either sides of said screw 8. Groove 10 is placed in the rotation plane of a groove 11, made in a driving member 17, revolving freely on a pivot 12 parallel to the motor shaft 6. A belt 18 connects the motor pulley 7 to the driving member 17.

The pivot 12 is rigidly fixed in a bushing 13, riveted on a bridge 14, which comprises brackets 15 and 16, fixed to the frame 1.

The driving member 17 comprises also coaxial steps 19, 20, 21, 22 of decreasing diameters. An intermediate wheel 23, comprising a band 24 made of a supple and elastic material such as rubber, revolves freely on an axle 25 carried by a lever 26. Lever 26 pivots on an axle 27, rigidly fastened to two parallel arms 28, connected to each other by a guiding rod 29 which revolves and slides axially in a bushing 30, fixed rigidly to the frame 2. A spring 31 abutting the frame, tends to push downwards the rod 29 and therefore the intermediate wheel 23. The lever 26 and the arms 28 constitute thus a known hinge device allowing, with the help of a driving device—not represented, but used in the usual manner for the driving of this kind of change-speed device—the co-operation of the intermediate wheel 23 successively with any one of the steps 19 to 22 of the driving member 17, while maintaining this intermediate wheel in frictional contact with the peripheric edge 32 of the turn-table 33, which pivots on a pivot 34, fixed on the frame. The driving member 17 carries also, rigidly fixed to it, a disc 35, preferably made of copper, aluminium or any other metal which is a good conductor of electricity. Said disc 35 revolves between the pole-pieces N and S of a magnetic circuit comprising a permanent magnet 36 and an iron piece 37, having the shape of a U. The magnetic circuit 36, 37 is carried by one of the arms of a lever 38 pivoted on an axle 39, fastened to the frame and the second arm of which is hinged at 40 on a connecting rod 41. A finger 42, rigidly fastened to said rod, is engaged in a slot 43 of a cam 45, fastened on an axle 44 provided with a control member M and revolving in a bearing 47 fastened to the frame 2. The axle 44 also extends into a guiding slot 46, made in the connecting rod 41.

The working of the described driving device is very similar to that of the known driving devices of this kind. In fact, the motor pulley 7 drives, through the belt 18, the driving member 17. The distance between the driving shaft and the pivot 12 is at least equal to three times the diameter of the motor pulley 7, and the belt is made of a supple and elastic material such as rubber for example, in order that the vibrations of the motor 1 may be practically entirely damped by the belt 18 and therefore cannot be transmitted to the driving member.

According to the position of a control member, not represented, of the change-speed device, the intermediary wheel 23 is in contact with the one or the other of the steps 19 to 22, so that the turn-table 33 is driven along at one of the four speeds determined by the diameters of said steps.

By actuating the control member M, the user may adjust exactly the driving speed of the turn-table 33 at the required speed for the hearing of a given record. In fact the angular displacement of the cam 45 causes by means of the finger 42 engaged in the slot 43, an axial displacement of the connecting rod 41, which in turn causes an angular displacement of the lever 38 and therefore a modification of the magnetic circuit position with respect to the rotation axis of the disc 35. Now the more the pole-pieces N and S of this magnetic circuit are brought nearer the pivot 12, the more the effect of the magnetic braking is increased. Thus, when the pole-pieces N and S are entirely released from the disc 35 (position represented in dotted lines in the Fig. 2), the driving speed of the turn-table 33 is greater than when the pole-pieces are entirely engaged on the disc 35 (position represented in full lines in Fig. 2).

The ratio of the diameters of the two grooves 9 and 10 of the motor pulley 7 is chosen in order to permit the electric motor to be supplied with alternating current of either 50 p./sec. or 60 p./sec. while keeping the same rotation speed of the driving member 17. When the motor is fed with alternating current of 50 p./sec., the motor pulley 7 is mounted on the shaft 6 as represented on the Fig. 1, and on the other hand, when the motor is fed with alternating current of 60 p./sec., said motor pulley is mounted in the opposite way on the shaft 6 in order that its groove 9 may now be placed in the plane of the groove 11 of the driving member 17.

Owing to the fact that the Ferrari disc of the magnetic braking device is fastened to the driving member 17, the disadvantages, mentioned above, of the known driving device are eliminated. In fact, the disc 35, fastened to the driving member 17, is not subjected to the motor vibrations, its mass is not added to the mass of the motor pulley and of the driving rotative members, and furthermore the control mechanism for the position of the magnetic circuit 36, 37 does not mechanically connect the frame to a member elastically suspended to said frame.

Further, in the known driving devices, the Ferrari disc is generally rigidly fixed on the motor pulley. In order to reduce the number of pieces, on the one hand, and, on the other hand, in order to reduce the weight of the rotation pieces, said disc is often made in one piece with said motor pulley. It follows that in these known driving devices, it is not possible to have a motor pulley comprising two grooves, the diameters of which are in a ratio corresponding to the ratio of speeds of the motor shaft when the motor is fed with alternating current of 50 p./sec. or 60 p./sec. In fact the motor pulleys of these known driving devices carrying the Ferrari disc have their axial position very well defined by the position of the magnetic circuit air-gap and cannot be modified. Consequently, special means, comparatively complicated, must be utilized in order to adapt the transmission ratio to the two speeds of the driving shaft corresponding to the motor feeding with alternating current of 50 p./sec. or 60 p./sec. The described transmission device presents therefore, also from this point of view, great advantages with respect to the known driving devices.

Figure 3:
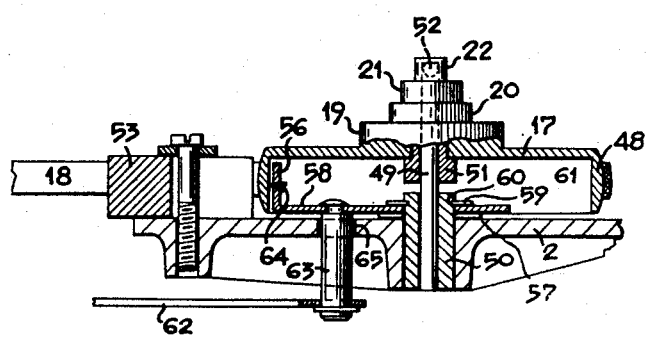
Fig. 3 is a partial cross sectional view of the second embodiment.
Figure 4:
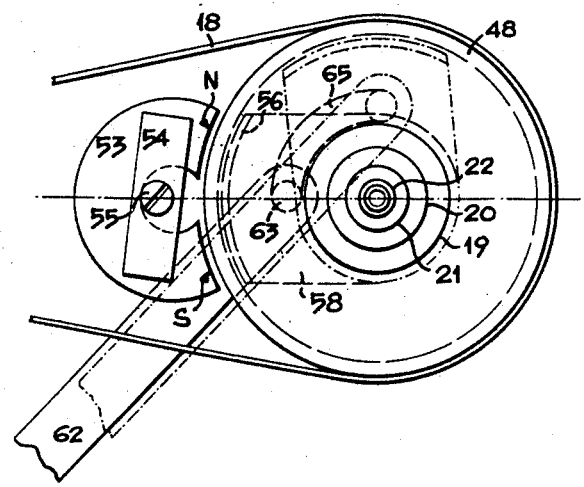
Fig. 4 is a partial view thereof.

In Figs. 3 and 4, only the members and elements required for an understanding of the driving device are illustrated, it being understood that this device is another embodiment of the driving device illustrated and described with reference to Figs. 1 and 2. In these figures the members and elements already described bear the same reference numbers.

The driving member 17, connected to the motor pulley (not shown) by a belt 18 comprises, on the one hand, four coaxial steps 19, 20, 21, 22 of decreasing diameters and, on the other hand, a driving pulley 48 on which is engaged the belt 18. An intermediate wheel (not shown) is, as described, in frictional contact, on the one hand, with one of the steps 19, 20, 21, 22, and, on the other hand, with the peripheral edge of the turn-table (not shown).

This driving member 17, made of a metal which is good conductor of electricity, for example, of copper or of aluminium, is pivoted freely, by means of a bushing 51 made of a self-greasing bronze and forming a bearing, on a pivot 49 rigidly fastened to the frame 2 of the speaking machine by means of a bushing 50. The driving member 17 rests on a ball bearing 52 on the upper extremity of the pivot 49.

The braking device is constituted by a permanent magnet 53 rigidly fastened to the frame 2 by a holding strap 54 and a screw 55. This magnet presents two pole faces N and S shaped in the form of cylinder sectors concentric to the pivot 49 and disposed close to the external surface of the driving pulley 48 and between the two sides of the belt 18.

In the interior of the pulley 48 is placed a movable sector 56 made of iron or of any other ferromagnetic material. Said cylinder sector 56 is carried by a carrier 58 engaged on the bushing 50 and revolving freely around the said bushing. The axial position of this carrier is determined by a ring 57 resting on the frame and an elastic ring 59 engaged in a circular groove 60 made in the extremity of the bushing 50. The external peripheral surface of the sector 56 is parallel to the cylindrical surface 64 of the inner cavity 61 of the driving pulley. The carrier 58 is mechanically connected by a rod 62 to the control member M (not shown) permitting modification of the value of the braking action. This rod is hinged on a pin 63 rigidly fixed on a holder 58 and extending through a slot 65 made in the frame 2.

Thus, by actuating the control member M, the user may displace the movable sector 56 from a minimum braking position (represented in dotted and dashed lines) to a maximum braking position (represented in dotted lines). In fact, the intensity of the magnetic field in which the peripheral edge of the pulley revolves is a function of the angular position of the sector 56 with respect to the pole faces N and S, so that the value of the Foucauld currents induced in said pulley and therefore the value of the braking action is a function of the angular position of said sector 56.

This embodiment presents the advantage of allowing the use of a pulley of a great diameter. Since the efficiency of the belt transmission increases as far as the sliding of the elastic belt 18 on the pulley and the driving member lessens, it follows that the greater are the diameters of the motor pulley 7 and of the driving pulley 48, the more the efficiency of the transmission increases. This embodiment permits an increase of the diameters of these pulleys without increasing the overall dimensions of the braking device.

In this embodiment, the pulley 48 constitutes the Ferrari disc of the braking device, so that the driving member 17 comprises one precision machining operation less than in the embodiment first described, this fact permitting lower cost of the machine.

Further, the sector 56, angularly displaceable, allows the modification of the length of the air-gaps of the magnetic circuit, and gives therefore the possibility of easily adjusting the maximum and minimum values of the braking effect.

Finally, this last embodiment has a greater control range, that is to say a greater ratio between the maximum and minimum values of the braking effect, while ensuring a very regular variation of the turn-table speed in function of the position of the sector 56. In the first described embodiment, the application radius on the Ferrari disc of the resulting braking force decreases as this force increases, since the magnetic circuit moves towards the center of the Ferrari disc. In the second embodiment described above, the application radius of the resulting braking force remains constant, this permitting the advantages described hereinbefore.

Two embodiments of a speaking machine, in accordance with the invention have been described, but it will be understood that many variants may be constructed without departing from the scope of the claimed invention.

One could, for example, place between the intermediate wheel 23 and the turn-table edge a drum carrying an auxiliary wheel provided with a rubber band in frictional contact with the turn-table edge.

The driving member may comprise any number of steps corresponding to the desired number of driving speeds for the turn-table. Said driving member may be made in one piece with the Ferrari disc or may be constituted by several distinct elements rigidly fixed on a sleeve revolving freely on the pivot 12 or on a shaft revolving freely in bearings.

I claim:

1. In a talking machine, the combination comprising a frame, a rotatable motor shaft carried by said frame, a turntable carried by said frame, a rotation-transmitting device carried by said frame independent of said motor shaft, flexible means drivingly connecting said motor shaft to said rotation-transmitting device, a conductor secured for rotation with said rotation-transmitting device, a driving member mounted on said frame and operatively connected with said rotation-transmitting device and said turntable to transmit rotation to said turntable, magnetic means, means mounting said magnetic means on said frame for movement into multiple relative coactive positions with said conductor, and control means mounted on said frame and operatively connected with said magnetic means for regulating the position of said magnetic means relative to said conductor for controlling the braking action of the conductor and the speed of the rotation-transmitting device.

2. A talking machine according to claim 1 wherein the conductor comprises a metal disc and the magnetic means comprise opposite poles of a magnet.

3. A talking machine according to claim 1 wherein the rotation-transmitting device comprises speed-change means for selectively rotating the driving member at different predetermined speeds.

4. A talking machine according to claim 2 in which the rotation-transmitting device is integral with the conductor.

5. A talking machine according to claim 1 wherein the motor shaft comprises speed-change means adapted to transmit substantially unchanged motion to the flexible means.

6. In a talking machine, the combination comprising a frame, a rotatable motor shaft carried by said frame, a turntable carried by said frame, a rotation-transmitting device carried by said frame independent of said motor shaft and having at least an annular part thereof formed from a conducting material, flexible means drivingly connecting said motor shaft to said rotation-transmitting device, magnetic means mounted on said frame adjacent to said part of said rotation-transmitting device, a driving member mounted on said frame and operatively connected with said rotation-transmitting device and said turntable to transmit rotation to said turntable, and control means mounted on said frame for regulating the position of said magnetic means relative to said conductor.

7. A talking machine according to claim 3 in which the speed-change means are integral with the rotation-transmitting device and are formed of metal.

8. A talking machine according to claim 6 in which the magnetic means comprise a magnet in the shape of a cylindrical sector.

9. A talking machine according to claim 10 in which the magnetic conductor is coaxially pivoted with and inside of said drum-shaped rotation-transmitting device.

10. In a talking machine, the combination comprising a frame, a rotatable motor shaft carried by said frame, a turntable carried by said frame, a drum-shaped rotation-transmitting device formed from a conducting material carried by said frame independent of said motor shaft, flexible means drivingly connecting said motor shaft to said rotation-transmitting device, a magnet mounted on said frame adjacent to said drum-shaped rotation-transmitting device, the pole face of said magnet facing one side of the skirt of said drum-shaped rotation-transmitting device, a displaceable magnetic conductor mounted on said frame on the other side of the skirt of said drum-shaped rotation-transmitting device, a driving member mounted on said frame and operatively connected with said rotation-transmitting device and said turntable to transmit rotation to said turntable, and control means mounted on said frame for regulating the position of said magnetic conductor relative to said pole faces of said magnet for controlling the braking action of the magnet and the speed of the rotation-transmitting device.

11. A talking machine according to claim 6, and means for adjustably mounting said magnetic means on said frame.

12. A talking machine according to claim 1 in which the control means comprise a control handle and a hinged lever, one end of which is secured to said control handle and the other end of which is secured to the magnetic means.

References Cited in the file of this patent

UNITED STATES PATENTS

| 1,265,115 | Roberts | May 7, 1918 |
| 2,528,271 | Gibbs et al. | Oct. 31, 1950 |

FOREIGN PATENTS

| 1,050,950 | France | Sept. 9, 1953 |
| 188,371 | Great Britain | Nov. 2, 1922 |